(12) United States Patent
Vandale et al.

(10) Patent No.: US 6,267,664 B1
(45) Date of Patent: Jul. 31, 2001

(54) EXTERIOR SIDE VIEW MIRROR AND SIDE WINDOW DEFOGGER SYSTEM

(76) Inventors: Alphonse J. Vandale; Margaret E. Vandale, both of 3240 Corona Ave., Norco, CA (US) 92860

( * ) Notice: Subject to any disclaimer, the term of this patent is extended or adjusted under 35 U.S.C. 154(b) by 0 days.

(21) Appl. No.: 09/653,996

(22) Filed: Sep. 1, 2000

(51) Int. Cl.[7] .................................................... B60H 1/24
(52) U.S. Cl. ............................................ 454/123; 454/124
(58) Field of Search .................................... 454/123, 124, 454/164

(56) References Cited

U.S. PATENT DOCUMENTS 4,462,303 * 7/1984 Gebhard .

FOREIGN PATENT DOCUMENTS 30 02 134-A * 7/1981 (DE) ..................................... 454/124
59-190039-A * 10/1984 (JP) ..................................... 454/143

* cited by examiner

*Primary Examiner*—Harold Joyce
(74) *Attorney, Agent, or Firm*—Joseph N. Breaux (57) ABSTRACT

A system including a defrosting mechanism in the form of an air stream directed against the side view mirror of a vehicle as well as an air stream directed against the side window of the vehicle adjacent to the side view mirror. The side view mirror and side window defogger system for vehicles also includes one or more adjustment mechanisms to allow the user to optimize the defogging air streams directed toward the side view mirror and the side window.

1 Claim, 9 Drawing Sheets

EXTERIOR SIDE VIEW MIRROR AND SIDE WINDOW DEFOGGER SYSTEM

TECHNICAL FIELD

The present invention relates to vehicle accessories and more particularly to a exterior side view mirror and side window defogger system that includes a side view mirror assembly and a mirror air supply ducting system; the side view mirror assembly being attachable to a vehicle door assembly and including a mirror housing portion defining a mirror receiving cavity within which a mirror is adjustably mounted such that an air cavity is created between a back surface of the mirror and the interior surface of the mirror housing portion and a hollow door connecting portion formed in integral connection with the mirror housing portion an air passageway formed between a door connecting opening and the air chamber, the hollow door connecting portion having a window vent outlet formed in connection therewith that includes a number of air flow slots formed through the exterior surface thereof that are shaped and adapted to discharge air through the air flow slots in a direction toward a door side window; the mirror air supply ducting system being installed within the side view mirror assembly; the mirror air supply ducting system including a door jamb air vent gasket provided on a terminal end of a door connecting duct section positioned to form a sealed airflow connection with a vehicle air vent duct gasket of the vehicle air duct system when the vehicle door is in the closed position, a side window defogger feed duct assembly including a mirror housing duct structure including an inlet duct in connection with an outlet end of the door connecting duct section, a window vent duct feed outlet in connection with the window vent outlet and a mirror defogger air distribution manifold outlet in connection with an air distribution manifold assembly; the air distribution manifold assembly being positioned within the air cavity and having a number of air vent openings shaped and adapted to direct air onto a back surface of the mirror; the inlet duct of the mirror housing duct structure having a on/off valve with a user manipulatable linkage that includes an on/off valve plate that is movable between an off position wherein the on/off valve plate totally blocks air flow between the inlet duct and the outlet end of the door connecting duct section and an on position allowing air flow therebetween; the mirror housing duct structure of the side window defogger feed duct assembly including an airflow adjustment mechanism; the air flow adjustment mechanism including a pivoting air diverter/blocking plate manipulatable by a user and mounted within the mirror housing duct structure such that the diverter/blocking plate is positionable in a first diverter/blocking plate position whereby all airflow from the inlet duct of the mirror housing duct structure is directed to the air distribution manifold assembly; a second diverter/blocking plate position whereby all airflow from the inlet duct of the mirror housing duct structure is directed to the window vent outlet; and a variety of user adjustment diverter/blocking plate positions located between the first and second diverter/blocking plate positions to allow the user to select the appropriate proportion of air flow to be directed respectively to the window vent outlet and the air distribution manifold to the side window and the side view mirror.

BACKGROUND ART

It can be dangerous to drive a vehcile with fogged up side view mirrors and/or side windows because the driver has an obstructed view of the traffic and can accidentally maneuver his/her vehicle in a manner to cause an accident. It would be a benefit, therefore, to have a system that would provide a defrosting mechanism in the form of an air stream directed against the side view mirror of a vehicle as well as an air stream directed agaisnt the side window of the vehicle adjacent to the side view mirror. Because differing weather conditions can require different defogging air streams to achieve a maximum defogging effect. It would be further desirable to have a side view mirror and side window defogger system for vehicles that further included one or more adjustment mechanisms to allow the user to optimize the defogging air streams directed toward the side view mirror and the side window.

GENERAL SUMMARY DISCUSSION OF INVENTION

It is thus an object of the invention to provide a exterior side view mirror and side window defogger system that includes a side view mirror assembly and a mirror air supply ducting system; the side view mirror assembly being attachable to a vehicle door assembly and including a mirror housing portion defining a mirror receiving cavity within which a mirror is adjustably mounted such that an air cavity is created between a back surface of the mirror and the interior surface of the mirror housing portion and a hollow door connecting portion formed in integral connection with the mirror housing portion an air passageway formed between a door connecting opening and the air chamber, the hollow door connecting portion having a window vent outlet formed in connection therewith that includes a number of air flow slots formed through the exterior surface thereof that are shaped and adapted to discharge air through the air flow slots in a direction toward a door side window; the mirror air supply ducting system being installed within the side view mirror assembly; the mirror air supply ducting system including a door jamb air vent gasket provided on a terminal end of a door connecting duct section positioned to form a sealed airflow connection with a vehicle air vent duct gasket of the vehicle air duct system when the vehicle door is in the closed position, a side window defogger feed duct assembly including a mirror housing duct structure including an inlet duct in connection with an outlet end of the door connecting duct section, a window vent duct feed outlet in connection with the window vent outlet and a mirror defogger air distribution manifold outlet in connection with an air distribution manifold assembly; the air distribution manifold assembly being positioned within the air cavity and having a number of air vent openings shaped and adapted to direct air onto a back surface of the mirror; the inlet duct of the mirror housing duct structure having a on/off valve with a user manipulatable linkage that includes an on/off valve plate that is movable between an off position wherein the on/off valve plate totally blocks air flow between the inlet duct and the outlet end of the door connecting duct section and an on position allowing air flow therebetween; the mirror housing duct structure of the side window defogger feed duct assembly including an airflow adjustment mechanism; the air flow adjustment mechanism including a pivoting air diverter/blocking plate manipulatable by a user and mounted within the mirror housing duct structure such that the diverter/blocking plate is positionable in a first diverter/blocking plate position whereby all airflow from the inlet duct of the mirror housing duct structure is directed to the air distribution manifold assembly; a second diverter/blocking plate position whereby all airflow from the inlet duct of the mirror housing duct structure is directed to the window vent outlet; and a variety of user adjustment diverter/blocking plate positions located between the first and second diverter/ blocking plate positions to allow the user to select the appropriate proportion of air flow to be directed respectively to the window vent outlet and the air distribution manifold to the side window and the side view mirror.

Accordingly, a exterior side view mirror and side window defogger system is provided. The exterior side view mirror and side window defogger system includes a side view mirror assembly and a mirror air supply ducting system; the side view mirror assembly being attachable to a vehicle door assembly and including a mirror housing portion defining a mirror receiving cavity within which a mirror is adjustably mounted such that an air cavity is created between a back surface of the mirror and the interior surface of the mirror housing portion and a hollow door connecting portion formed in integral connection with the mirror housing portion an air passageway formed between a door connecting opening and the air chamber, the hollow door connecting portion having a window vent outlet formed in connection therewith that includes a number of air flow slots formed through the exterior surface thereof that are shaped and adapted to discharge air through the air flow slots in a direction toward a door side window; the mirror air supply ducting system being installed within the side view mirror assembly; the mirror air supply ducting system including a door jamb air vent gasket provided on a terminal end of a door connecting duct section positioned to form a sealed airflow connection with a vehicle air vent duct gasket of the vehicle air duct system when the vehicle door is in the closed position, a side window defogger feed duct assembly including a mirror housing duct structure including an inlet duct in connection with an outlet end of the door connecting duct section, a window vent duct feed outlet in connection with the window vent outlet and a mirror defogger air distribution manifold outlet in connection with an air distribution manifold assembly; the air distribution manifold assembly being positioned within the air cavity and having a number of air vent openings shaped and adapted to direct air onto a back surface of the mirror; the inlet duct of the mirror housing duct structure having a on/off valve with a user manipulatable linkage that includes an on/off valve plate that is movable between an off position wherein the on/off valve plate totally blocks air flow between the inlet duct and the outlet end of the door connecting duct section and an on position allowing air flow therebetween; the mirror housing duct structure of the side window defogger feed duct assembly including an airflow adjustment mechanism; the air flow adjustment mechanism including a pivoting air diverter/ blocking plate manipulatable by a user and mounted within the mirror housing duct structure such that the diverter/ blocking plate is positionable in a first diverter/blocking plate position whereby all airflow from the inlet duct of the mirror housing duct structure is directed to the air distribution manifold assembly; a second diverter/blocking plate position whereby all airflow from the inlet duct of the mirror housing duct structure is directed to the window vent outlet; and a variety of user adjustment diverter/blocking plate positions located between the first and second diverter/ blocking plate positions to allow the user to select the appropriate proportion of air flow to be directed respectively to the window vent outlet and the air distribution manifold to the side window and the side view mirror.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary side view mirror assembly of the exterior side view mirror and side window defogger system of the present invention showing the side view mirror assembly attached to a representative vehicle door assembly and including a mirror housing portion defining a mirror receiving cavity within which a mirror is adjustably mounted such that an air cavity is created between a back surface of the mirror and the interior surface of the mirror housing portion and a hollow door connecting portion formed in integral connection with the mirror housing portion an air passageway formed between a door connecting opening and the air chamber, the hollow door connecting portion having a window vent outlet formed in connection therewith a number of air flow slots formed through the exterior surface thereof and shaped and adapted to discharge air through the air flow slots in a direction toward a door side window.

FIG. 2 is a partial cutaway view showing an exemplary mirror air supply ducting system of the exterior side view mirror and side window defogger system of the present invention (installed within the side view mirror assembly (shown in dashed lines) along with a partial section of the vehicle air duct system of the representative vehicle; the mirror air supply ducting system including a door jamb air vent gasket provided on a terminal end of a door connecting duct section positioned to form a sealed airflow connection with a vehicle air vent duct gasket of the vehicle air duct system when the vehicle door is in the closed position, a side window defogger feed duct assembly including a mirror housing duct structure including an inlet duct in connection with an outlet end of the door connecting duct section, a window vent duct feed outlet in connection with the window vent outlet and a mirror defogger air distribution manifold outlet in connection with an air distribution manifold assembly positioned within the air cavity and having a number of air vent openings shaped and adapted to direct air onto a back surface of the mirror; the inlet duct of the mirror housing duct structure having a on/off valve with a user manipulatable linkage that includes an on/off valve plate that is movable between a including an off position wherein the on/off valve plate totally blocks air flow between the inlet duct and the outlet end of the door connecting duct section; the mirror housing duct structure of the side window defogger feed duct assembly including an airflow adjustment mechanism.

FIG. 3 the air flow adjustment mechanism including a pivoting air diverter/blocking plate manipulatable by a user and mounted within the mirror housing duct structure such that the diverter/blocking plate is positionable in a first diverter/blocking plate position whereby all airflow from the inlet duct of the mirror housing duct structure is directed to the air distribution manifold assembly; a second diverter/ blocking plate position whereby all airflow from the inlet duct of the mirror housing duct structure is directed to the window vent outlet; and a variety of user adjustment diverter/blocking plate positions located between the first and second diverter/blocking plate positions to allow the user to select the appropriate proportion of air flow to be directed respectively to and/or split between the window vent outlet and the air distribution manifold.

FIG. 4 is a perspective view showing a second exemplary mirror housing assembly of the exterior side view mirror and side window defogger system of the present invention adapted for use with vehicles such as pickup trucks, eighteen wheelers and the like.

EXEMPLARY MODE FOR CARRYING OUT THE INVENTION

FIGS. 1,1A,2,3,3a,3b,3c,4 and 5 show various aspects of exemplary embodiments of the exterior side view mirror and side window defogger of the present invention generally designated 10. Exterior side view mirror and side side window defogger 10 includes a side view mirror assembly, generally desginated 12, and a mirror air supply ducting system generally desginated 14.

Side view mirror assembly 12 is attachable to a vehicle door assembly 18 and incldues a mirror housing portion 20 defining a mirror receiving cavity 22 (shown in dashed lines of FIG. 1) within which a mirror 24 is adjustably mounted such that an air cavity 26 (FIG. 1) is created between a back surface of mirror 24 and the interior surface of the mirror housing portion 20. Side view mirror assembly 12 also includes a hollow door connecting portion 28 formed in integral connection with mirror housing portion 12 and has an air passageway formed between a door connecting opening 30 and air chamber 26. Hollow door connecting portion 28 also has a window vent outlet, generally desginated 34, formed in connection therewith and having a number of air flow slots 36 formed through the exterior surface thereof and shaped and adapted to discharge air through air flow slots 36 in a direction toward a door side window 40

Figure 1:
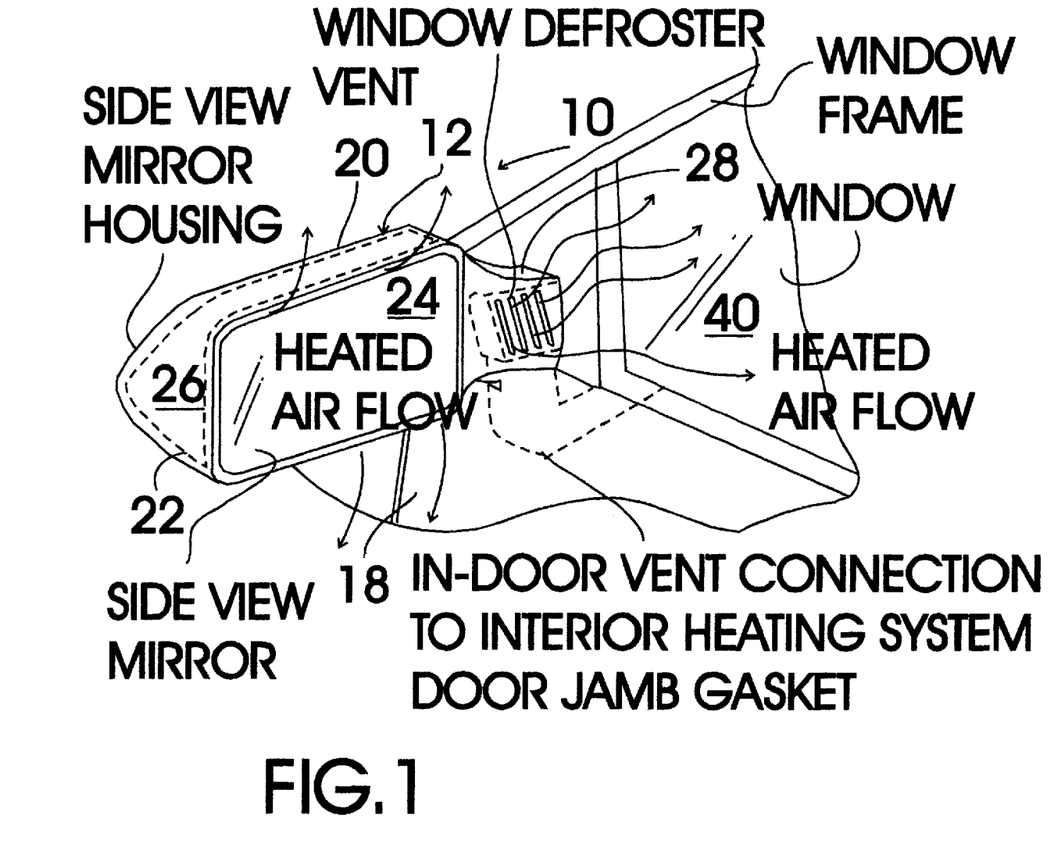
FIG. 1A is a partial plan view of the exterior side view mirror and side window defogger system of the present invention installed on a representative passenger vehicle showing two side mirror assemblies, the air-flow control panel, and the mirror air supply ducting (shown in dashed lines) between the side mirror assemblies and the existing passenger vehicle air duct system.
Figure 1A:
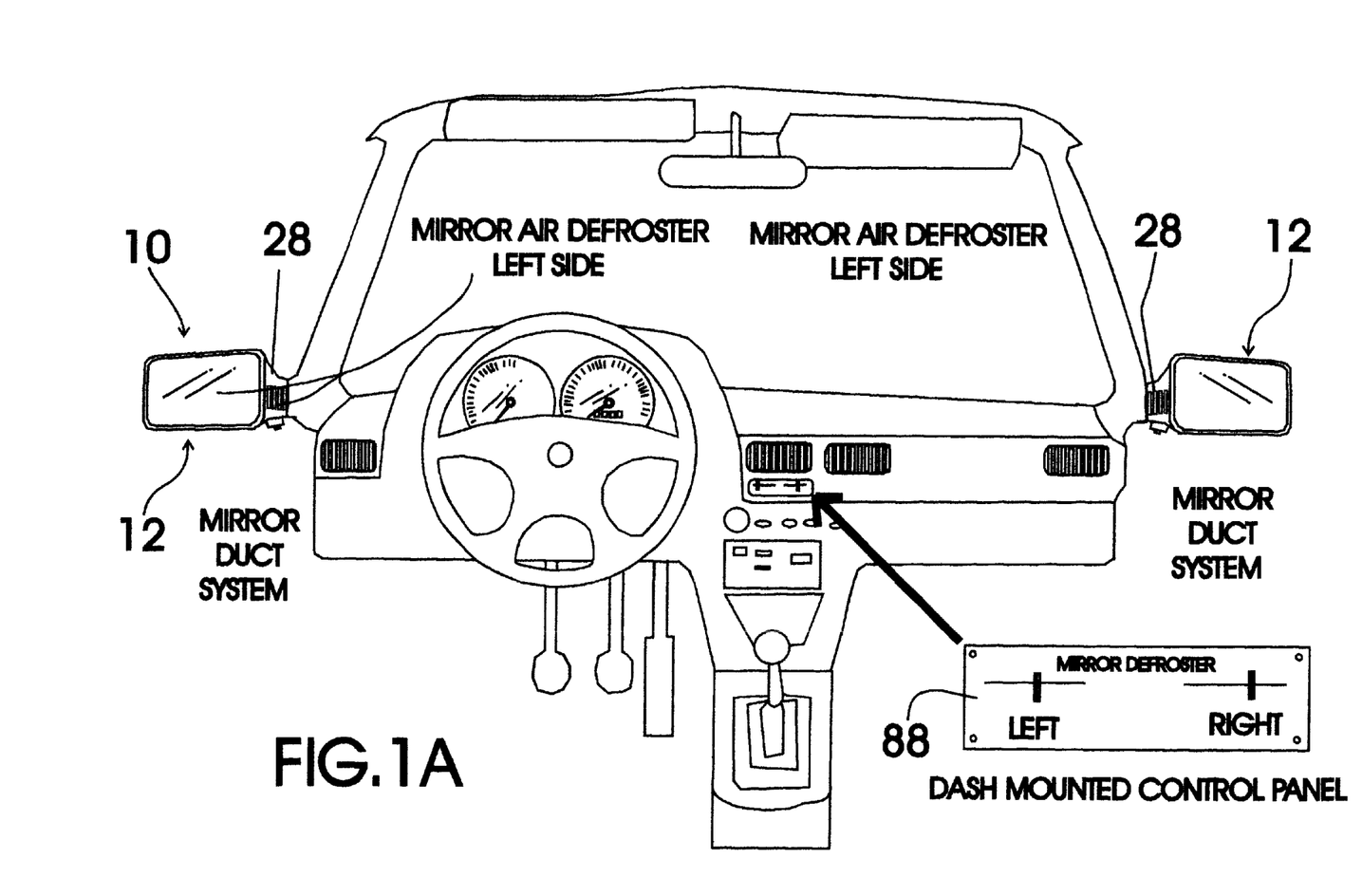
Figure 2:
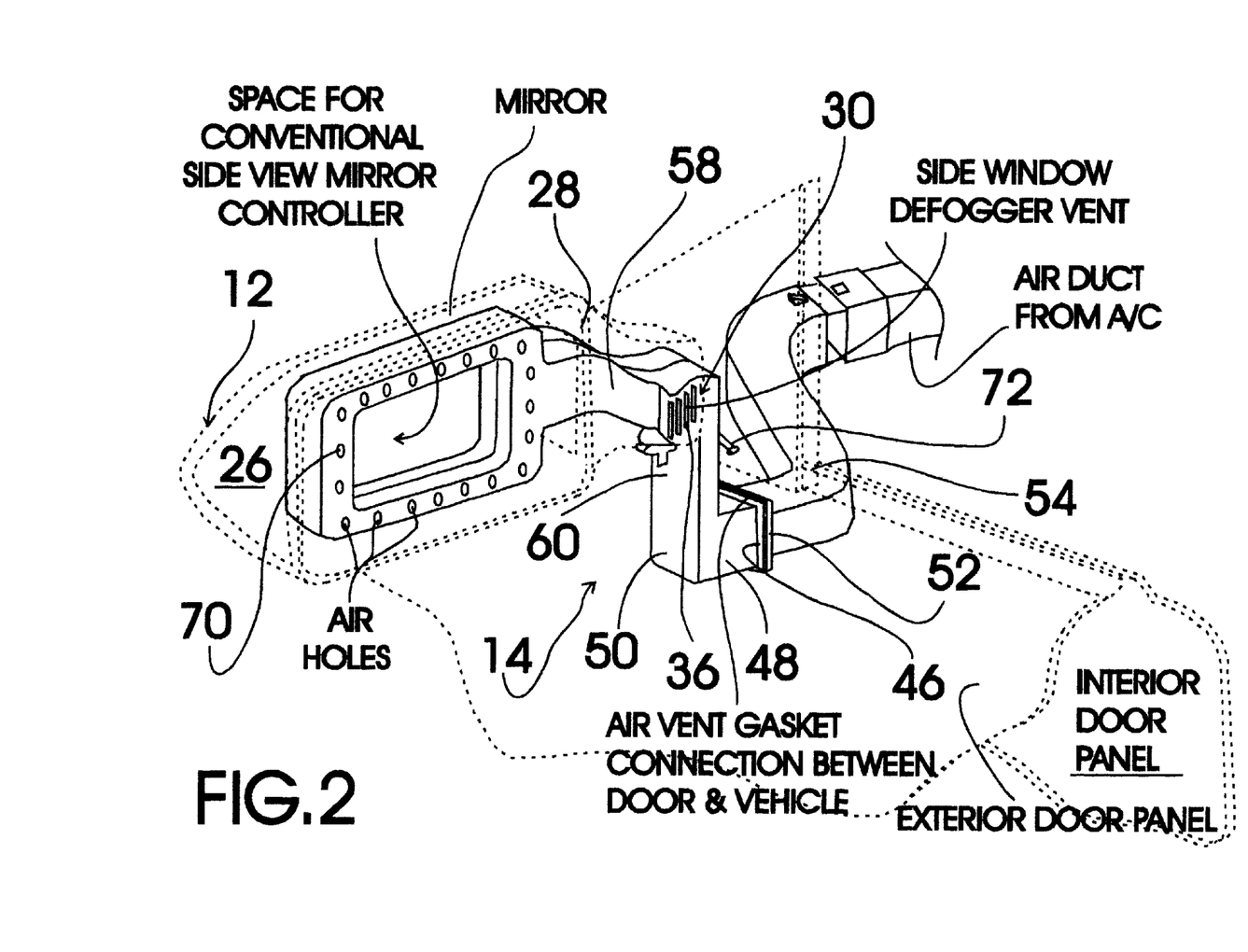
Figure 3:
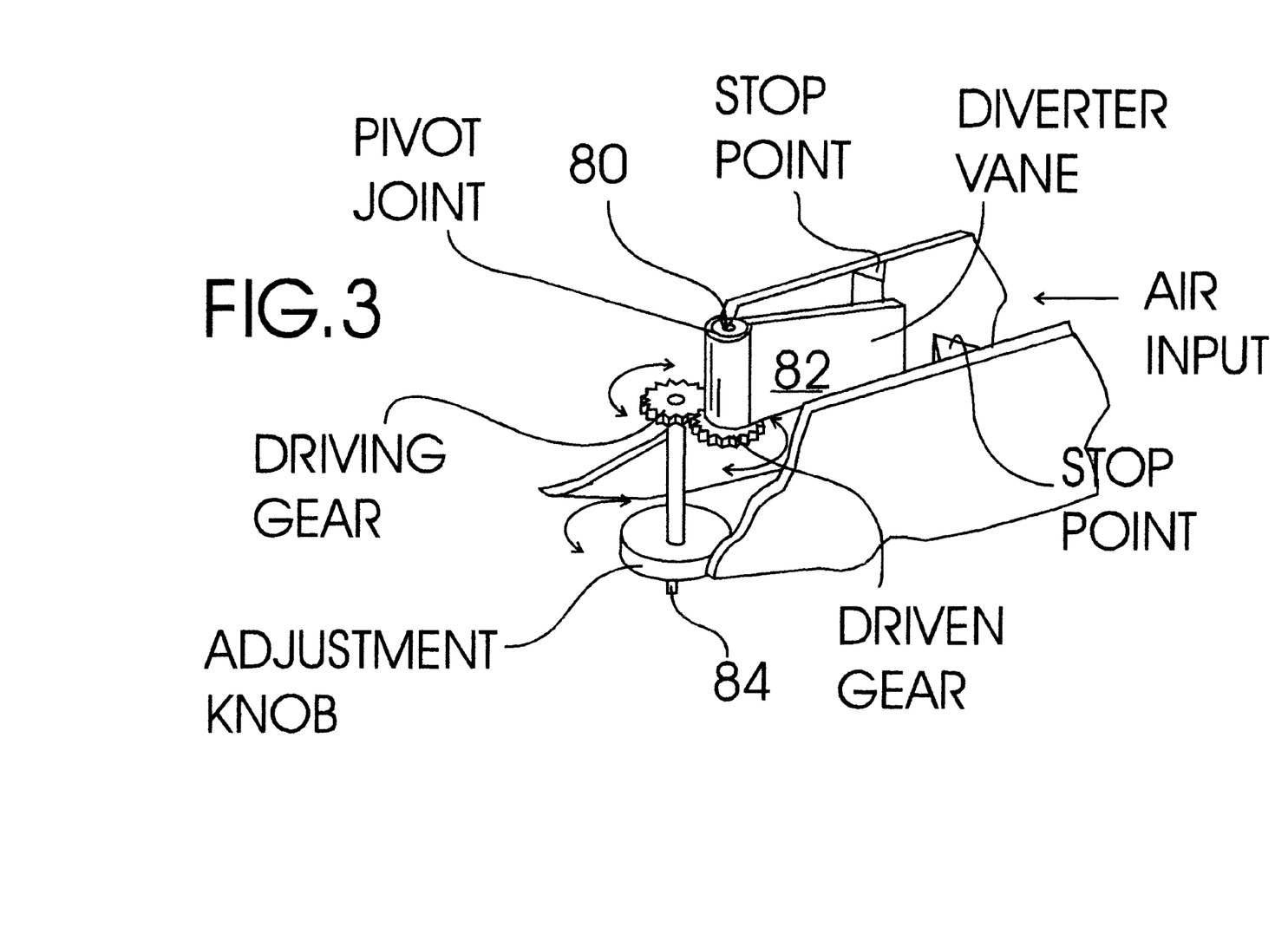
FIG. 3a is a partial cutaway view showing the diverter/blocking plate is positioned the first diverter/blocking plate position whereby all airflow from the inlet duct of the mirror housing duct structure is directed to the air distribution manifold assembly.
FIG. 3b is a partial cutaway view showing the diverter/blocking plate is positioned the second diverter/blocking plate position whereby all airflow from the inlet duct of the mirror housing duct structure is directed to the window vent outlet.
FIG. 3c shows the air flow adjustment mechanism in on of the variety of user adjustment diverter/blocking plate positions located between the first and second diverter/blocking plate positions to allow the user to select the appropriate proportion of air flow to be directed respectively to the window vent outlet and the air distribution manifold.
Figure 3A:
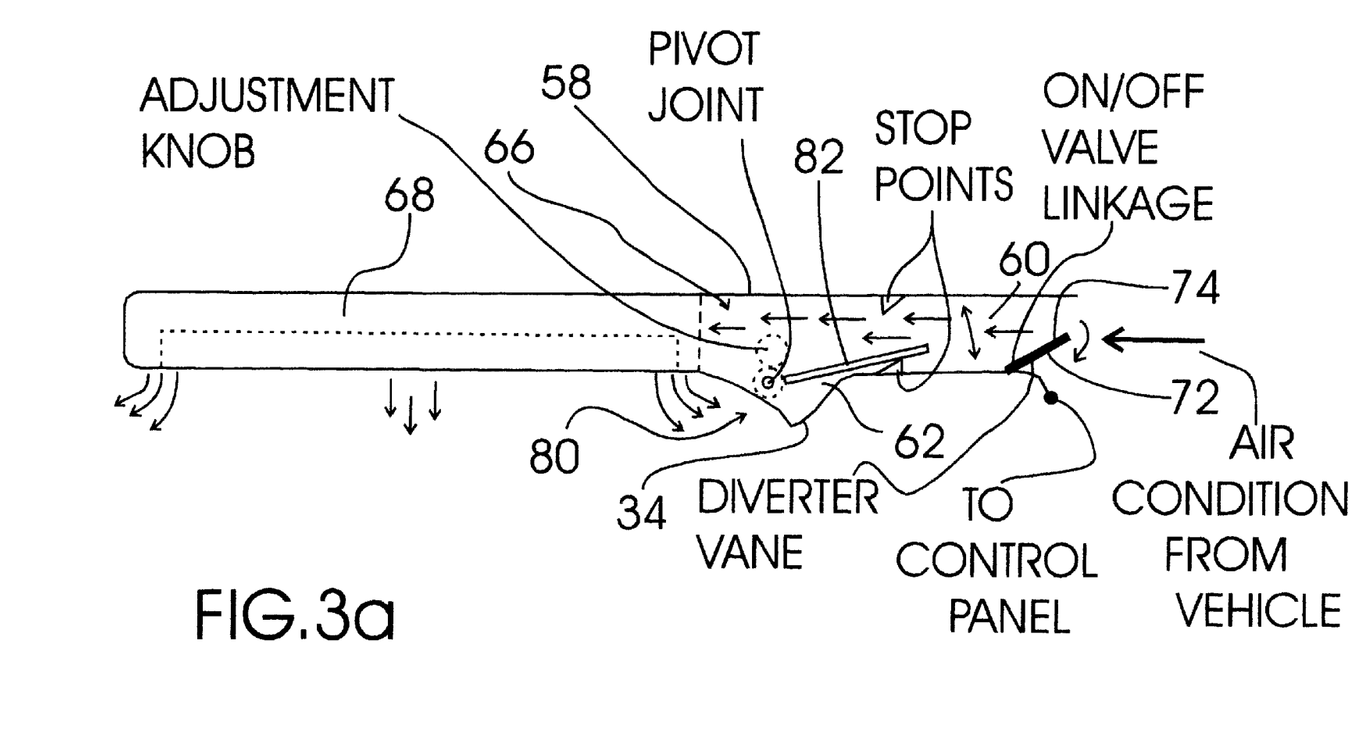
Figure 3B:
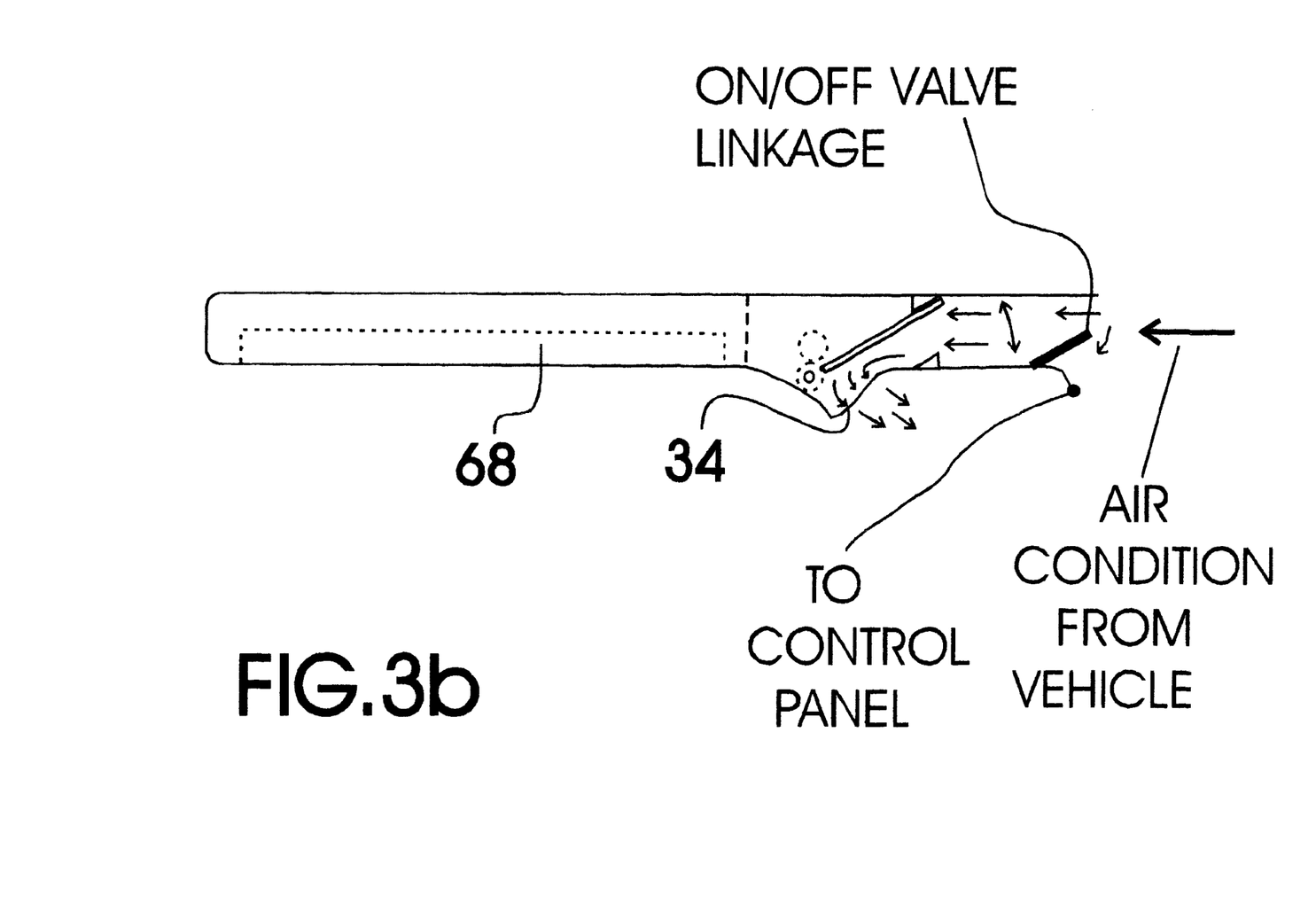
Figure 3C:
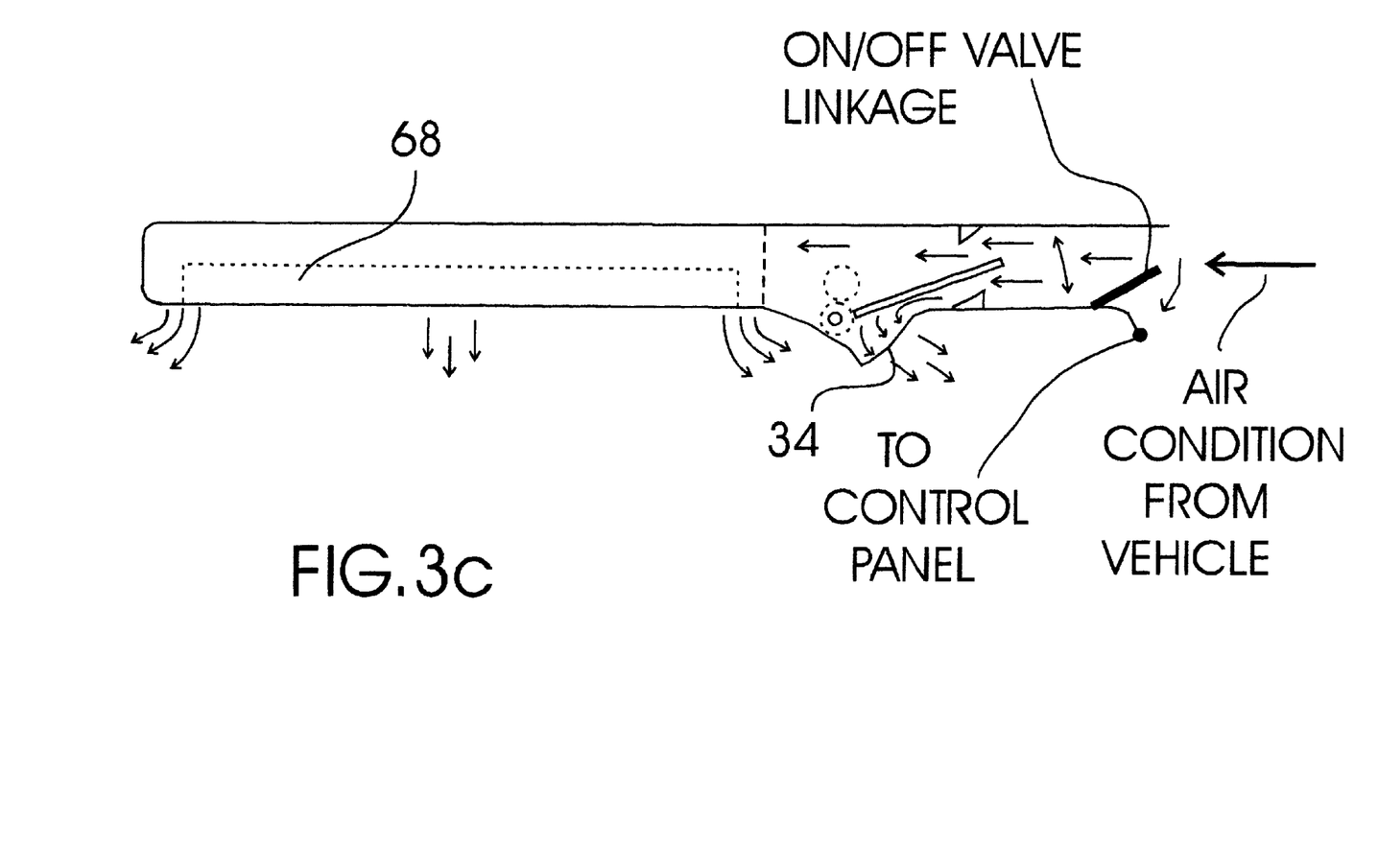

Mirror air supply ducting system 14 is installed within side view mirror assembly 12. Mirror air supply ducting system 14 includes a door jamb air vent gasket 46 provided on a terminal end 48 of a door connecting duct section 50 positioned to form a sealed airflow connection with a vehicle air duct gasket 52 of the vehicle air duct system 54 when the vehicle door 18 is in the closed position. Mirror air supply duct system 14 also includes a side window defogger feed duct assembly, generally desginated 58, including a mirror housing duct structure including an inlet duct 60 in connection with an outlet end of door connecting duct section 50, a window vent duct feed outlet 62 in connection with window vent outlet 34 and a mirror defogger air distribution manifold outlet 66 in connection with an air distribution manifold assembly 68 positioned within air cavity 26. Air distribution manifold assembly 68 has a number of air vent openings 70 shaped and adapted to direct air onto the back surface of mirror 24.

Inlet duct 60 of mirror housing duct structure 58 has an on/off valve 72 with a user manipulatable linkage that includes an on/off valve plate 74 that is movable between an off position wherein the on/off valve plate totally blocks air flow between the inlet duct 60 and the outlet end of door connecting duct section 50 and an open position.

Mirror housing duct structure 58 also includes an airflow adjustment mechanism, generally desginated 80. Air flow adjustment mechanism 80 includes a pivoting air diverter/blocking plate 82 that is manipulatable by a user rotating adjsutment knob 84 and that is mounted within mirror housing duct structure 58 such that diverter/blocking plate 82 is positionable in a first diverter/blocking plate position (shown in FIG. 3a) whereby all airflow from the inlet duct 60 is directed to air distribution manifold assembly 68; a second diverter/blocking plate position (shown in FIG. 3b) whereby all airflow from inlet duct 60 is directed to window vent outlet 34; and a variety of user adjustment diverter/blocking plate positions (one of the number shown in FIG. 3c) located between the first and second diverter/blocking plate positions to allow the user to select the appropriate proportion of air flow to be directed respectively to the window vent outlet 34 and the air distribution manifold 68. In this embodiment, exterior side view mirror and side view window defogger system 10 inlcudes a passenger compartment mounted control panel 88 for controlling various air flow aspects of the system.

Figure 4:
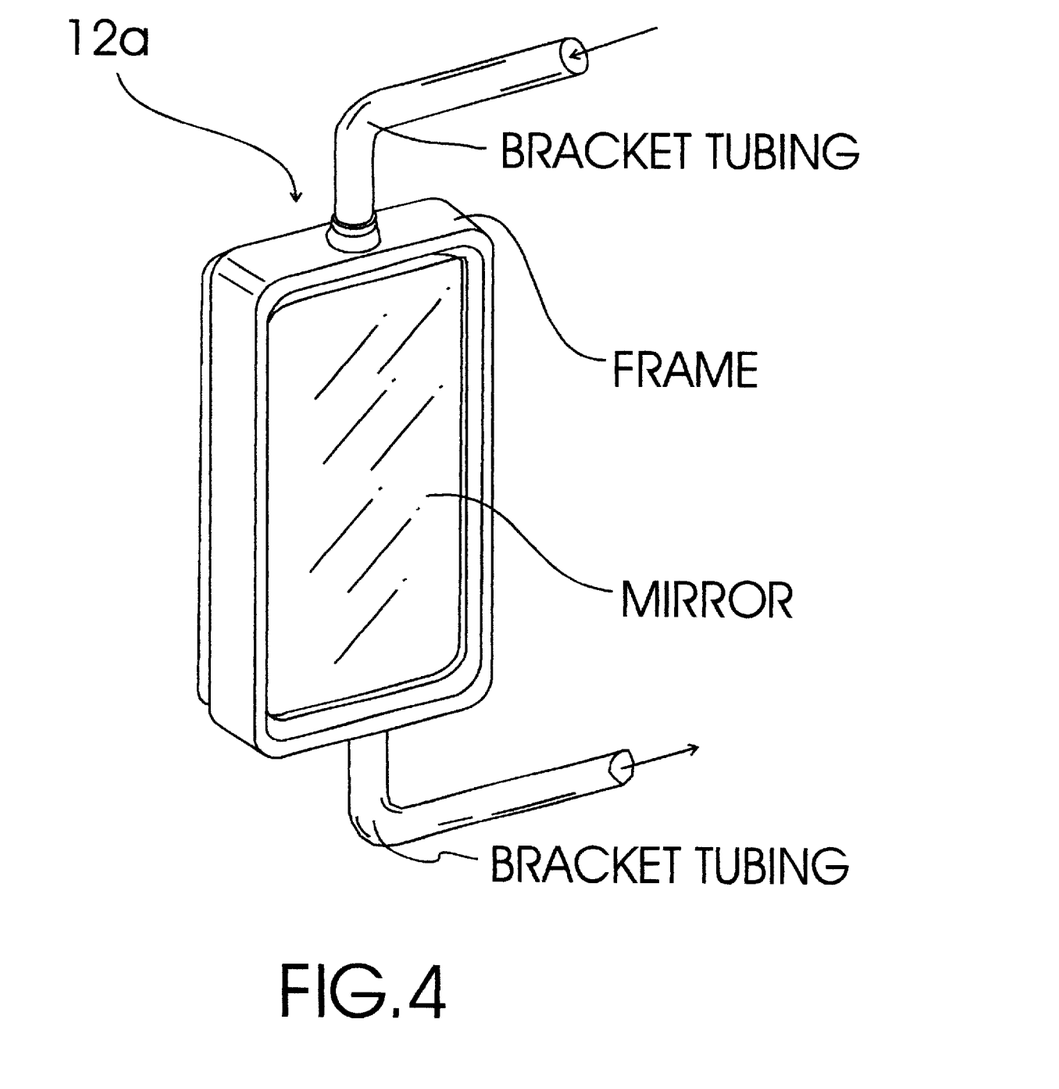
Figure 5:
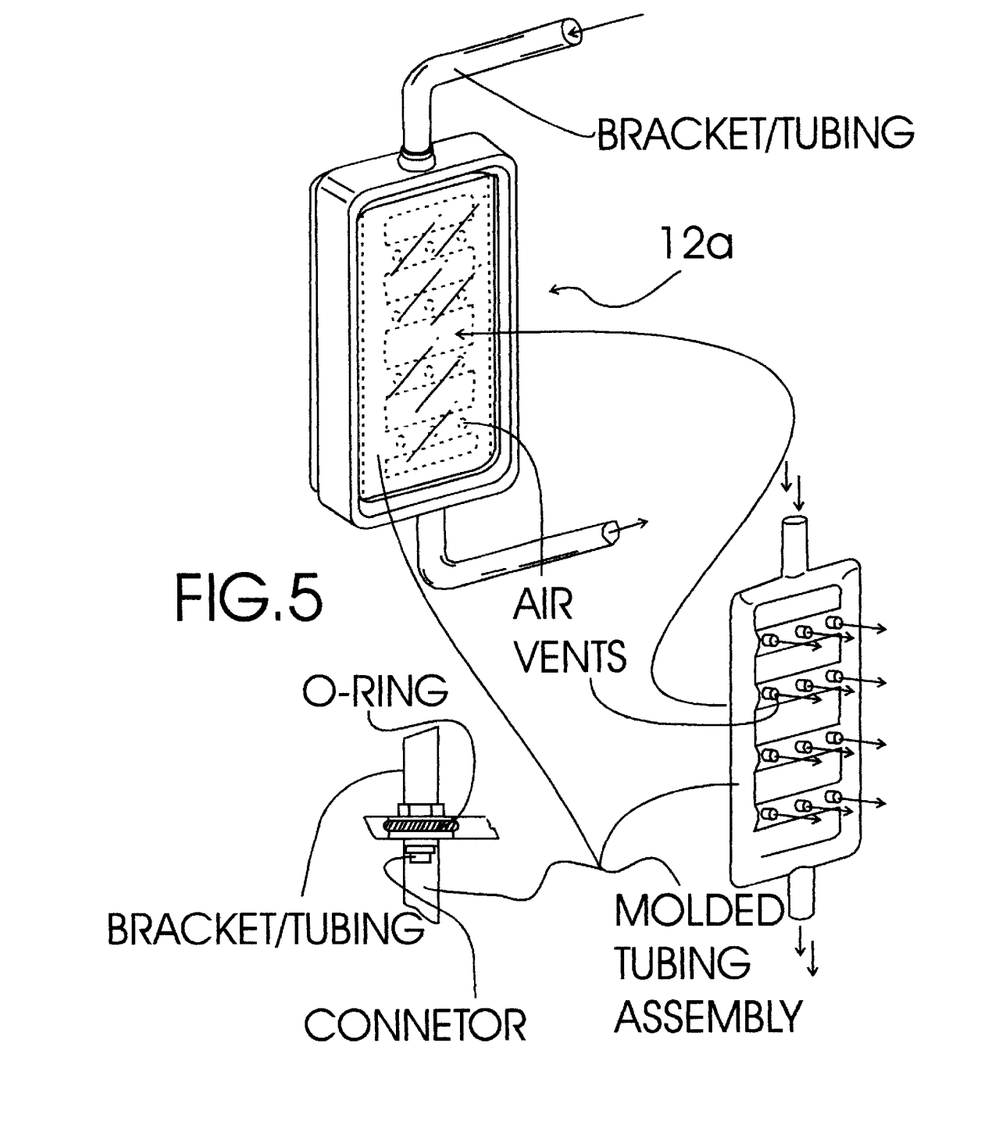
FIG. 5 is a perspective view showing the mirror housing assembly of FIG. 4 along with an exemplary air distribution manifold assembly adapted for use therewith.

FIGS. 4 and 5 show an exemplary side view mirror housing embodiment, generally desginated 12a, that is adopated for use with a truck or the like.

It can be seen from the preceding description that a exterior side view mirror and side window defogger system has been provided.

It is noted that the embodiment of the exterior side view mirror and side window defogger system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A exterior side view mirror and side window defogger system for use with vehicles including a vehicle door assembly having a door side window mounted therein and pivotal between and open and closed position within a vehicle door opening frame, and a vehicle air duct system including an air supply ducting system including a vehicle air vent duct gasket positioned within the vehicle door opening frame; said exterior side view mirror and side window defogger system comprising:

a side view mirror assembly; and a mirror air supply ducting system;

the side view mirror assembly being attachable to a vehicle door assembly and including a mirror housing portion defining a mirror receiving cavity within which a mirror is adjustably mounted such that an air cavity is created between a back surface of the mirror and the interior surface of the mirror housing portion and a hollow door connecting portion formed in integral connection with the mirror housing portion an air passageway formed between a door connecting opening and the air chamber, the hollow door connecting portion having a window vent outlet formed in connection therewith that includes a number of air flow slots formed through the exterior surface thereof that are shaped and adapted to discharge air through the air flow slots in a direction toward a door side window;

the mirror air supply ducting system being installed within the side view mirror assembly;

the mirror air supply ducting system including a door jamb air vent gasket provided on a terminal end of a door connecting duct section positioned to form a sealed airflow connection with the vehicle air vent duct gasket of the vehicle air duct system when the vehicle door is in the closed position, a side window defogger feed duct assembly including a mirror housing duct structure including an inlet duct in connection with an outlet end of the door connecting duct section, a window vent duct feed outlet in connection with the window vent outlet and a mirror defogger air distribution manifold outlet in connection with an air distribution manifold assembly;

the air distribution manifold assembly being positioned within the air cavity and having a number of air vent openings shaped and adapted to direct air onto a back surface of the mirror;

the inlet duct of the mirror housing duct structure having a on/off valve with a user manipulatable linkage that includes an on/off valve plate that is movable between an off position wherein the on/off valve plate totally blocks air flow between the inlet duct and the outlet end of the door connecting duct section and an on position allowing air flow therebetween;

the mirror housing duct structure of the side window defogger feed duct assembly including an airflow adjustment mechanism;

the air flow adjustment mechanism including a pivoting air diverter/blocking plate manipulatable by a user and mounted within the mirror housing duct structure such that the diverter/blocking plate is positionable in a first diverter/blocking plate position whereby all airflow from the inlet duct of the mirror housing duct structure is directed to the air distribution manifold assembly; a second diverter/blocking plate position whereby all airflow from the inlet duct of the mirror housing duct structure is directed to the window vent outlet; and a variety of user adjustment diverter/blocking plate positions located between the first and second diverter/blocking plate positions to allow the user to select the appropriate proportion of air flow to be directed respectively to the window vent outlet and the air distribution manifold to the side window and the side view mirror.

* * * * *